O. C. WOOLSON.
FURNACE.
APPLICATION FILED SEPT. 12, 1917.

1,304,235.

Patented May 20, 1919.
7 SHEETS—SHEET 1.

Witnesses:
Frank L. Faggiani
J. E. Danielson

Inventor:
Orosco C. Woolson,
By his Atty, F. N. Richards

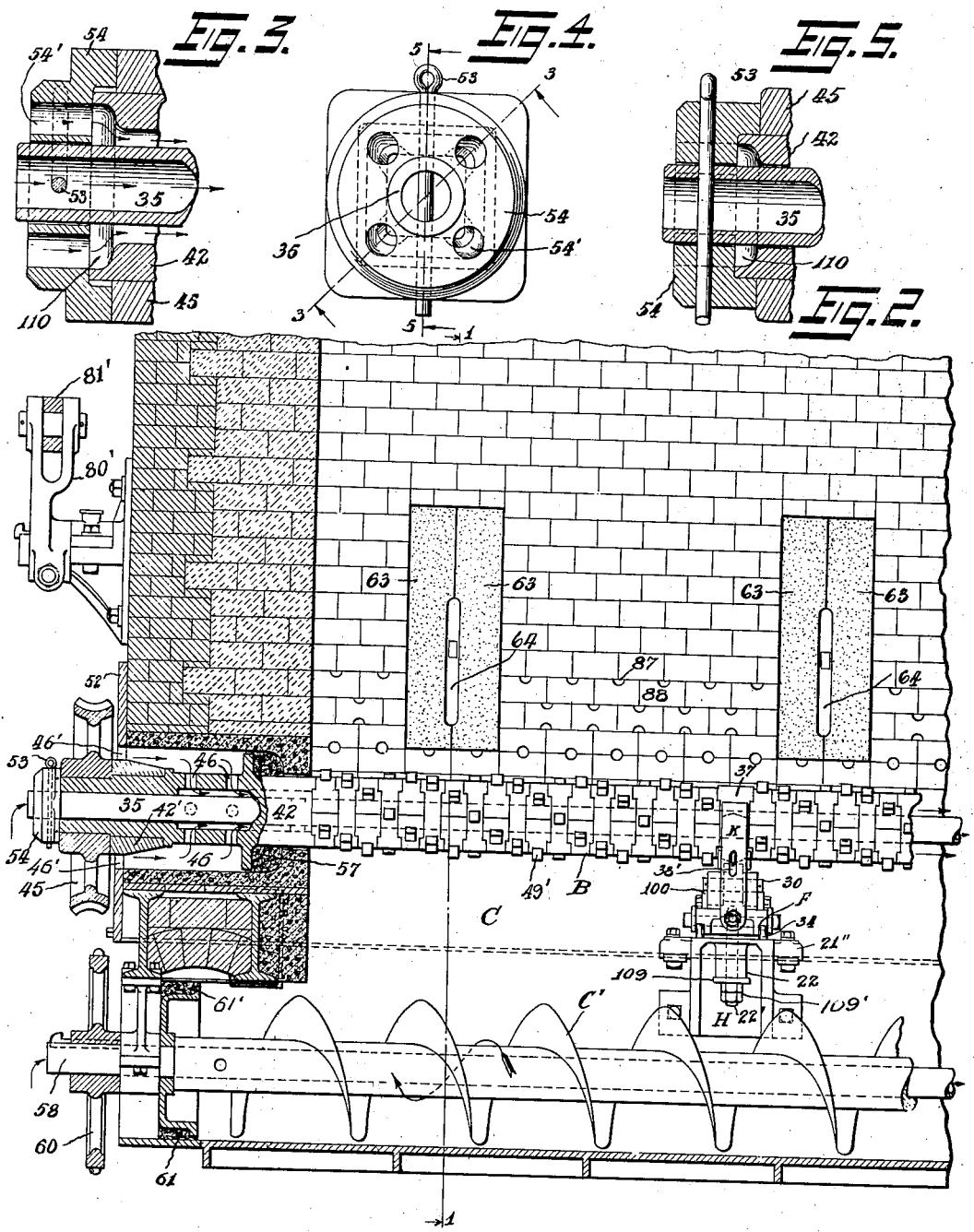

O. C. WOOLSON.
FURNACE.
APPLICATION FILED SEPT. 12, 1917.
1,304,235.
Patented May 20, 1919.
7 SHEETS—SHEET 3.
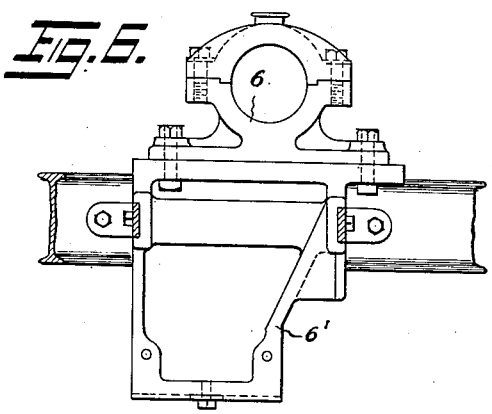
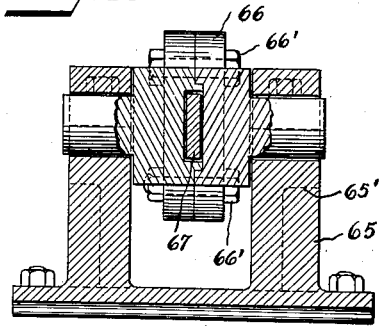
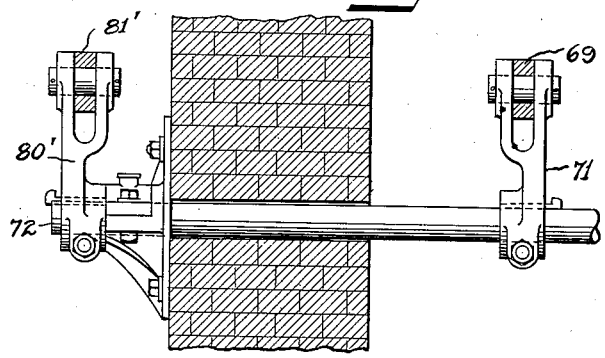
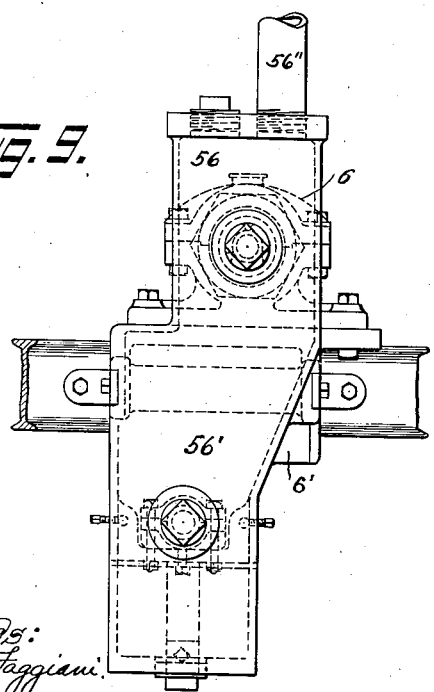
Witnesses:
Frank L. Faggiani
J. E. Davidson
Inventor:
Orosco C. Woolson,
By his Att'y, F. H. Richards.

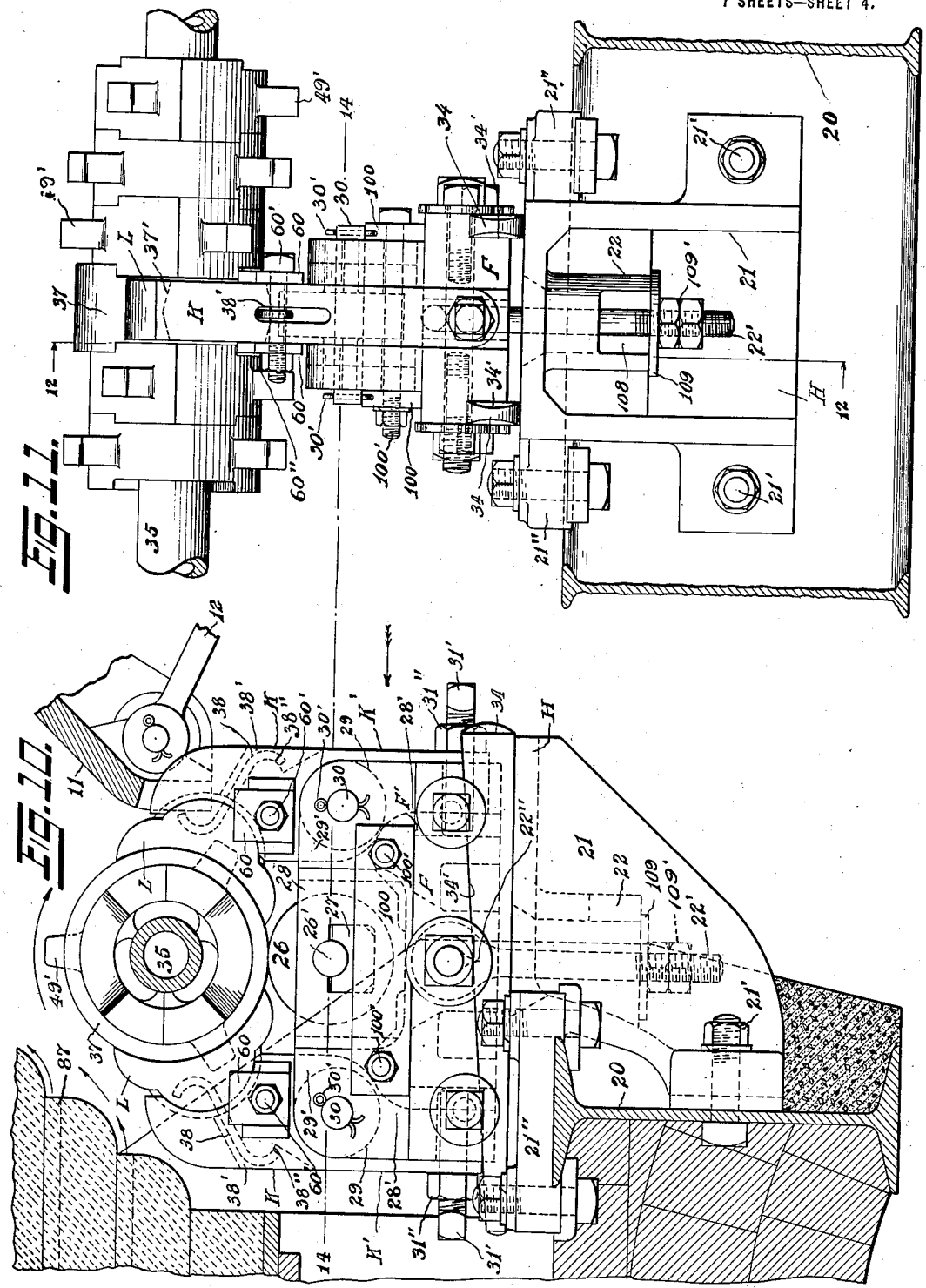

O. C. WOOLSON.
FURNACE.
APPLICATION FILED SEPT. 12, 1917.
1,304,235.
Patented May 20, 1919.
7 SHEETS—SHEET 5.
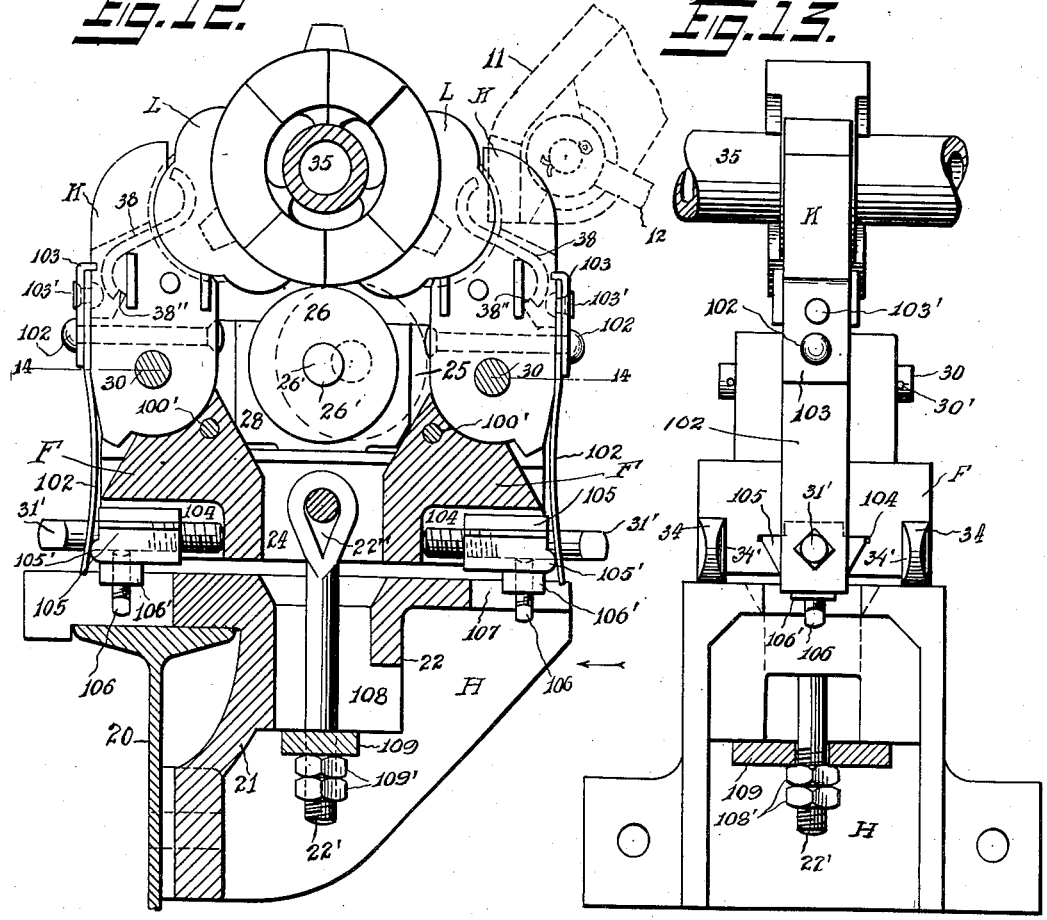
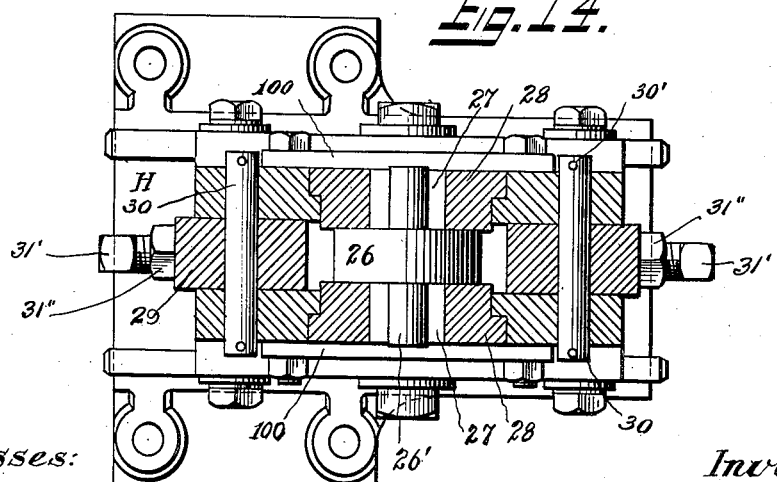
Witnesses:
Frank L. Faggiani
J. E. Davidson
Inventor:
Orosco C. Woolson,
By his Att'y, F. A. Richards.

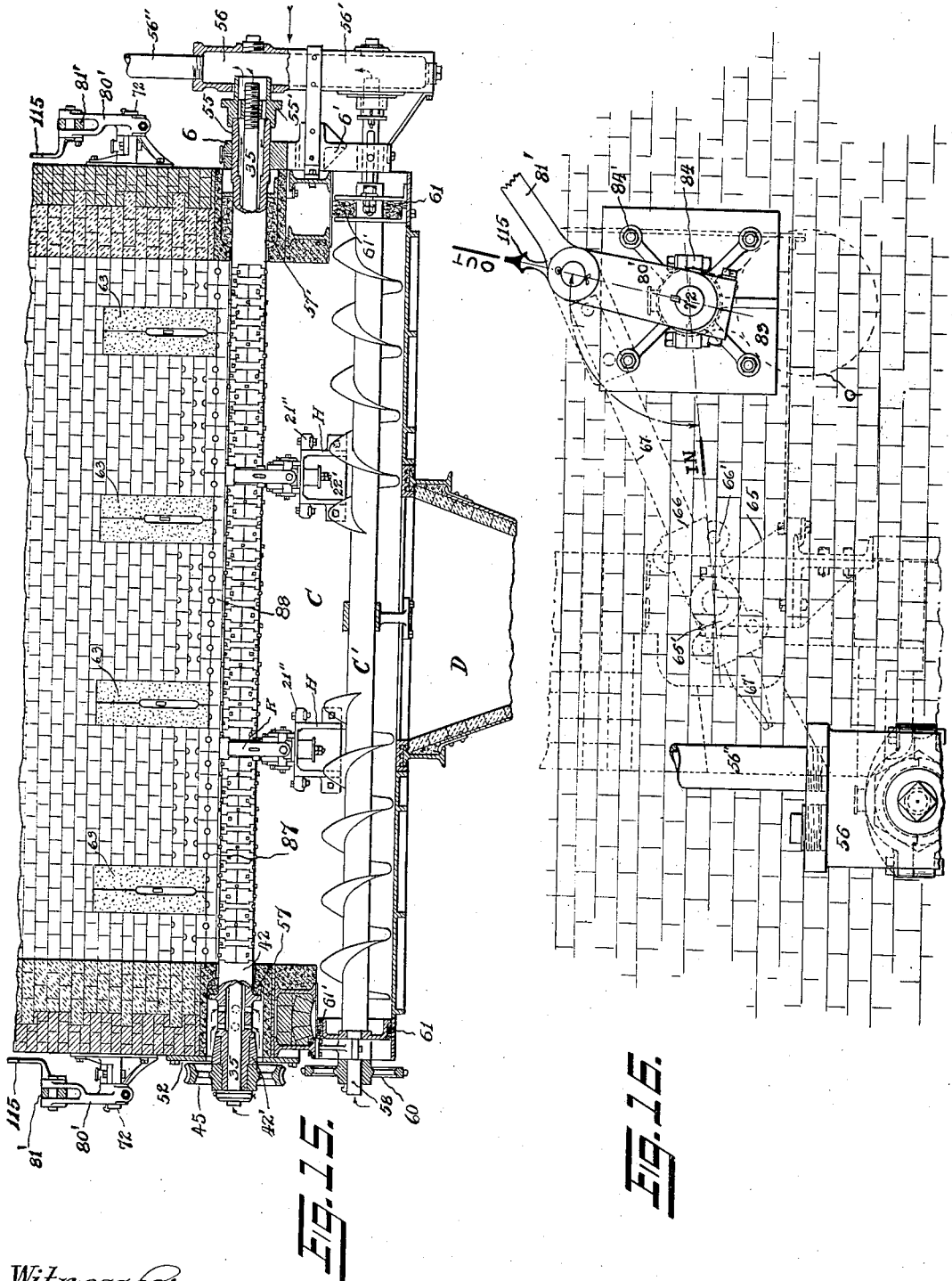

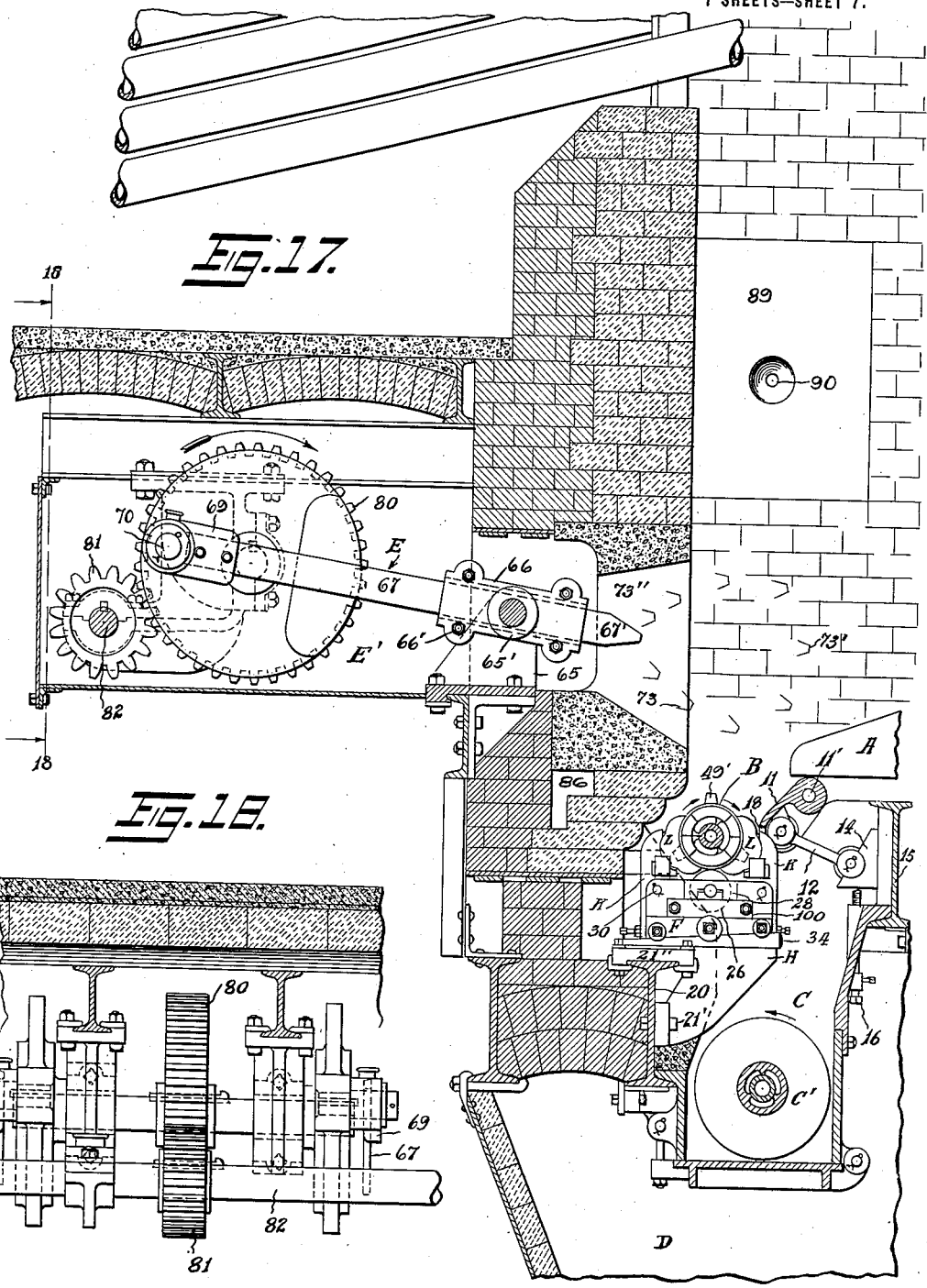

UNITED STATES PATENT OFFICE.

OROSCO C. WOOLSON, OF NEWARK, NEW JERSEY.

FURNACE.

1,304,235.   Specification of Letters Patent.   Patented May 20, 1919.

Application filed September 12, 1917. Serial No. 190,883.

*To all whom it may concern:*

Be it known that I, OROSCO C. WOOLSON, a citizen of the United States, residing in city of Newark, in the county of Essex and State of New Jersey, have invented certain new and useful Improvements in Furnaces, of which the following is a specification.

The objects of my invention are primarily to provide self-feeding furnaces of all types and modes of operation, at the ash and delivery end, with means for rousing, tooling and breaking up the clinker-bed that inevitably forms thereat, so as to permit of further combustion in the clinker-bed; and for thereafter crushing the non-combustible clinkers to substantially ash fineness; and finally removing the ash and clinker; all the mechanism being usually and preferably but not in all cases actuated by power.

Until recently, the width of such furnaces have usually been such, that it has been considered practical, if not highly efficient, to operate them from side doors by hand in the matter of tooling the coal down over the grates, and rousing the discharging clinker and ash. In the more modern type of such structures however, the width of furnaces demanded for large boiler units must be much wider than formerly, and the tooling of the ash and clinker residuum to be eliminated has therefore become too difficult and laborious, and far from efficiently, to be done by hand: First for the reason that the operator is subjected to great heat and in danger of being burned by back-draft; and second in that the heating power is much reduced by the large excess of air permitted to pass to the combustion chamber at points that are most detrimental to complete and perfect combustion; both of which objections are removed by the use of my invention herein described, shown and claimed.

The main object of my invention is to provide a new and improved form of furnace, provided with power actuated tooling-devices for tooling the ash and clinker, especially designed for use with rotating clinker-crushing devices (although not limited to use therewith) in self-feeding furnaces of all kinds and characters; but more especially designed for use in inclined grate self-feeding furnaces of any type, especially those having rotary clinker-crushers at the ash delivery end of the grate, and to provide below the clinker-crusher apparatus, a suitable conveyer for delivering the residuum of ash and clinker constantly to a storage-bin or hopper, or other suitable place or receptacle; the construction and arrangement of the various mechanisms being such that by the operation of the power-actuated tools, the caked bed of clinkers, which naturally forms at the lower and delivery end of the grate, may by power means be tooled and broken up so as to permit of the combustion of the remaining particles of carbonaceous material contained therein, whereby much fuel that otherwise would be wasted by passing out unconsumed, may be utilized, and also obtain a more perfect distribution of coal over the grates and prevent bare spots. This tooling operation, and the crushing of the clinker and the final removal of the ash from the furnace after such crushing being performed without the admission of any air to the furnace, save the natural draft necessary to proper combustion.

In the drawings hereof, I have shown my improved furnace and furnace-tooling apparatus, in a cheap and efficient form of construction, of long-life, etc., of one of the many forms in which the broad principles of my invention may be embodied, combined with a rotary clinker-crusher mechanism also of my invention of, improved form, over somewhat similar mechanisms covered by former patents and a pending application of mine; and also combined with ash-removing and storing apparatus also of my invention; all of such structures together forming a complete practical automatically operated cheap and efficient furnace for steam-boilers and other heating devices of any form, and for any purpose, and in such drawings I have shown the grate as of the inclined longitudinally and vertically vibrating grate-bar type, which I have found highly efficient for use in combination with the other apparatus of my invention herein shown, described and claimed.

My said invention is shown, described and claimed, in the following specification of which the accompanying drawings form a part, wherein similar letters and numerals of reference designate like or equivalent parts wherever found throughout the several views, and in which:

Fig. 2 is a view thereof in substantially central vertical section of one end of the furnace unit shown in Fig. 1, taken substantially on the line 2—2 of such Fig. 1, looking toward the left in the direction of the arrow; omitting the grate and crusher-apron.

Fig. 3 is a side view in diagonal section on the line 3—3 of Fig. 4, looking in the direction of the arrows, of the end of the crusher-shaft, etc., Fig. 4 is a front end view thereof in perspective;

Figure 1:
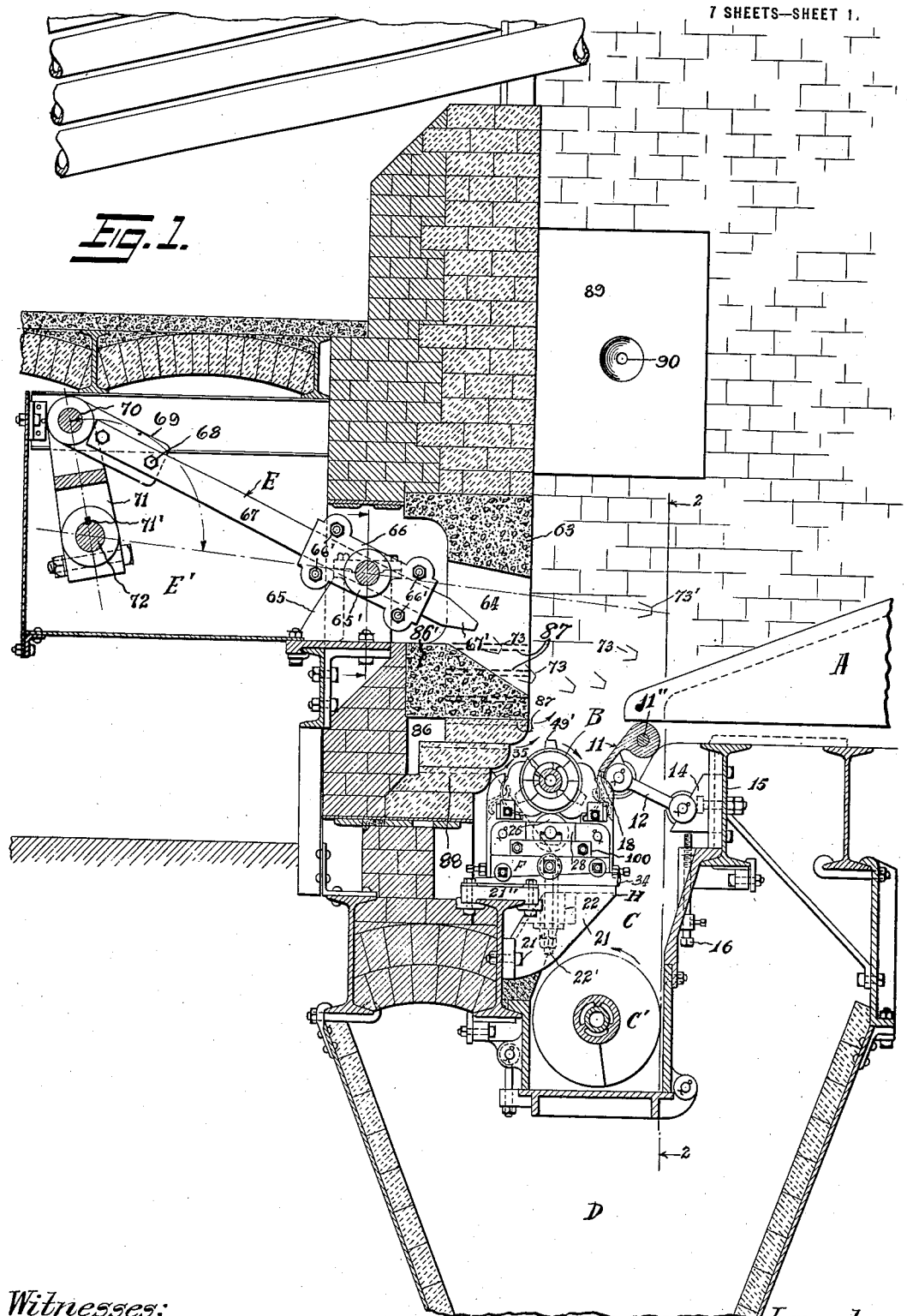
Figure 1 is a side view in central vertical longitudinal section of the rear portion of a furnace unit of my improved form taken on the line 1—1 of Fig. 2.

Fig. 5 a sectional view thereof on the line 5—5, looking toward the left;

Fig. 6, is a side view in detail looking toward the left of Fig. 15, of the crusher-shaft journal-box and supporting frame;

Fig. 7 is a front view in section of the rousing-tool and trunnion casing or housing thereof;

Fig. 8 is a front view of the rousing-tool shaft and throw-lever etc., thereof in position; and Fig. 9 is an end view of the exhaust dust-box in position on the bracket shown in Fig. 6.

Fig. 10 is an end view in detail on an enlarged scale from that shown in Fig. 1, of one of my improved adjustable crusher-grinder journal-brackets, portion of the furnace wall, etc., the crusher-shaft and crusher-apron only being shown in section.

Fig. 11 is a like view of such crusher supporting-journal looking toward the front of Fig. 10, in the direction of the arrow;

Fig. 12 is a detail side view of the structure shown in Figs. 10 and 11, of a somewhat slightly modified form of construction looking toward the right of Fig. 11, and taken in substantially central vertical section on the line 12—12 thereof;

Fig. 13 is a front view of the structure shown in Fig. 12 looking toward the left of said Fig. 12 in the direction of the arrow; and Fig. 14 is a top-plan view of such mechanism taken in horizontal section on the line 14 of Figs. 10 to 13 inclusive;

Fig. 15 is a front view in section on a small scale of a complete furnace only parts of which are shown in Figs. 1 and 2, the boilers being omitted, looking toward the left of Fig. 1, and showing the same construction as Fig. 2.

Fig. 16 is a view partially in dotted lines, looking toward the left of Fig. 15, of one of the tooling-shaft-mechanisms, and its reciprocating connecting rods, and throw crank-shaft, etc.;

Fig. 17 is a side view similar to that shown in Fig. 1 of the tooling-mechanism, of a somewhat slightly modified form of construction and mode of operation; and Fig. 18 is a view of such modified form of tool-actuating mechanism shown in Fig. 17, looking toward the right of Fig. 17, in the direction of the arrow, taken in section on the line 18—18 of such Fig. 17.

Referring to the drawings:

The reference letter A designates the grate of a furnace, which furnace is of any suitable width and length; B is the clinker-crusher and accompanying mechanism; C, the ash removing conveyer-trough, having the rotary screw-conveyer C', which finally discharges the residual waste of crushed-clinkers and ash into the storage-bin or delivery-hopper D, located below such trough C; E is the clinker rousing-tool normally drawn back into the rousing-tool chamber E', adapted to be thrown forward into the clinker-chamber portion of the furnace at the foot of the inclined grate A, above the clinker-crusher mechanism B to break up and rouse the clinker-bed.

One good and efficient form of front feed grate for use in this connection, which in itself forms no part of my invention, I have found to be of the slightly inclined form shown in Figs. 1, 10, and 12; and located underneath the lower and delivery end of the grate, and extending longitudinally thereof, is the crusher-apron 11, pivoted as indicated at 11', of Figs. 1-17 inclined downward toward the crushing mechanism, between which and the rotating crushers B, the clinkers and coal are finally crushed until delivered to the ash-hopper below the same. This crusher apron 11 is pivotally connected at either end, for a considerable length with supporting link-bars 12, between which at suitable intervals, are located like intermediate link-bars each pivotally connected with an individual slide-block 14, reciprocating in a suitable slide-piece carried by the bar 15 of the furnace-frame, each of which slide-blocks is vertically adjustable as to its inclination, by means of a regulating-screw 16.

The crushing lip or face of the apron 11 against which the dogs 49' of the revoluble crusher-mechanism crush the clinker, has the delivery orifice 18, which the raising or lowering of the slide-blocks 14 varies in size, so the fineness to which the ash and clinker is reduced by the grinding process may be determined by the vertical adjustment of the slide-bars 14, forced upward by the adjusting-screws 16.

Broadly, the crusher mechanism B is substantially of the same construction shown in my copending application, Serial No. 114,117, filed August 10, 1916, and differs from the construction shown therein, mainly in the fact that the various sections slipped upon the binder-crusher shaft 35 of the crushing-mechanism, are axially split, and are self-locking upon such shaft 35 into a composite rotary clinker crushing combined end-grate and crusher-bar, without the use of separate locking mechanism, such as screws, bolts, etc.

When the furnace is of considerable length, the furnace heat will cause such crusher end-grate mechanism to sag, and in consequence, the grinding or crusher-bar must be of necessity, supported by any required number of suitable intermediate-journals H, between the two end-journal supports thereof; and the details of such intermediate supporting-journals, are shown in Figs. 10 to 14 inclusive. By reason of the great heat to which this mechanism is subjected, more or less distortion will occur, which necessitates adjustment from time to time to keep the crusher-members and supporting shaft in proper alinement, and in proper coaction with the crushing or grinding-apron 11.
Each of such intermediate-journals H are fully shown in detail in such Figs. 10, to 14, and as shown in Fig. 12 in place in a furnace unit of the most modern type each comprises a supporting-bracket 21, secured to the I beam 20 of the furnace-wall by bolts 21', and bolts and clamps 21''. Formed integral with the bracket 21 at the center is the downwardly depending slip-sleeve 22, in which reciprocates the shaft of the adjusting screw eye-bolt 22', having at the top the eye 22''; and resting upon the top face of the bracket 21 is the vertically adjustable base-block F, having on either side at the bottom a slide-way or lift-slot 34' open at the side and bottom, the upper wall face of which inclines downward toward the rear; and in such slide-ways or lift-slots the wedge-shaped adjusting slide-keys 34, the ends of which extend outward beyond the front and rear of the base-plate F, so that the same may be driven in and out of position by a hammer, so as to raise or lower the adjustable base-block F.

Such base-block F, is provided with a lower central eye-bolt chamber 24, merging at the top into the open faced central journal-block chamber 25, in which is located the double journal-box 28' (Figs. 10 and 12) carrying in its central cavity the crusher supporting anti-friction wheel 26, having the shaft 26' usually formed integral therewith or firmly secured thereto; and usually and preferably supported by suitable side main journal-boxes 28, of substantially the form shown in detail in horizontal cross-section in Fig. 14, (which Fig. 14 is a top plan view of Figs. 10 to 13 taken partially in section on the line 14 of such figures) which main-journal boxes are slipped endwise into position into the central upper journal-box cavity in the base-block F on either side, into a central cavity of which journal-boxes is slipped in like manner on either side, an auxiliary journal-box 27, having in its upper face a journal-cavity to receive its shaft journal 26'; which auxiliary journal-box is formed of any suitable anti-fraction metal, etc., and once in position such main journal-box 28 and its auxiliary journal-box 27, are each held in place against side displacement by the side securing-bars 100, superposed upon the sides of the central narrow upper portion F', of the vertically adjustable base-block F, which bars are secured in place by the screw bolts 100'.

In furnaces of comparatively excessive heat, it is preferable that the anti-friction-wheel 26, should be journaled in the auxiliary journal blocks 27, to one side of the center thereof, usually toward the crusher-apron 11, as clearly indicated in dotted lines in Fig. 12, or means (not shown) of any suitable construction may be provided, for rendering the auxiliary journal blocks 27, vertically and horizontally adjustable in the main-journal-block 28, to bring about the same result.

Formed in the front and rear faces of the base-block F are vertical slots 28' Fig. 10, in which fit the crusher journal block arms K having the side-journals 29, formed integral therewith each fitting in a journal pocket 29', formed in the inner walls of the slots 28', shafts 30 passing through both walls of the slots 28' and side-journals 29, and being held against displacement by cotter pins 30', whereby such journal block-arms K will be held in position in the base-block F so as to freely vibrate therein upon the side-journals 29, each of such arms being provided at the bottom with a regulating set-screw 31' Figs 10, 12 and 14, screwed therein, and having a lock-nut 31'', by which the bottom ends of the vibrating arms K are thrown outward and the tops thereof carrying the crusher journal-blocks L in like manner inward, so as to force such journal-blocks L, against the peripherally plane surfaced journal-ring 37 Fig. 10, secured upon the crusher-shaft 35, and forming one of the units of the composite crusher-bar; differing only from the other units in that its periphery is of slightly greater diameter, and also in being unprovided with the clinker-crushing lugs or teeth 49'. The crusher journal-blocks L are usually and preferably of cast-iron, and are of substantially the shape shown so as to fit upon the peripheral outer surface of the journal ring 37; and projecting centrally rearwardly therefrom, is a steel or soft iron securing-wire 38, cast into the same, the outer free end of which wire, in securing the block L in position in the vibrating-lever arm K; is passed out through a perforation or central slot or orifice 38' in K, of somewhat larger diameter than the wire, formed in and through such arm K, and hammered down at its outer end over the securing-shoulder lug 38'', so as to loosely secure K and L together, while allowing of slight rocking vertical movement of L; such block L having its central outer peripheral portion, of substantially V tongued shape, as indicated at 37' in dotted line, (Fig. 11) and K being provided with a like shaped groove; and such crusher journal-block L, being further locked against side displacement by the two side-plates 60, held in place by the screw bolts 60' and nuts 60''.

In the form of construction shown in Figs. 10 and 11 the vibrating crusher journal-block arms K, are each provided with the downwardly extending lower end-portion K'; in each of which is threaded a tensioning-screw 31' Figs. 10, 13 and 14, bearing at its inner end against the end face of the end-slot of the block F; so as to throw such extension K' outward, and the upper end inward, so as to regulate the pressure of the journal-block L against the periphery of the crusher-journal ring 37, which screw 31' is provided with the lock-nut 31'', to secure the same against displacement.

In the somewhat modified form of construction of journal block shown in Figs. 12, and 13 the lower end portion K' of K, is omitted, and its place taken by a resilient spring 102, held in place on K by a securing-rivet or screw 102', passing through the upper end of the spring and through K, and through a securing-plate 103, secured to the upper end of such spring by a rivet 103'. And formed in the block F, at the bottom on either side is a slide-slot 104, open at the bottom and at the end, and of inverted truncated V shape (Fig. 13), in which reciprocates the like V shaped spring tensioning slide-block 105, having the rock-lug 105', bearing against the lower end of the spring 102, in which slide-slot 104 is threaded the tensioning-screw 31', the inner end of which bears against the rear wall of the slide-slot, by which the spring 102, may be tensioned so as to regulate the pressure of the journal-block L against the journal-ring 37 within a wide limit:—and the slide-block 105, is provided with a set screw 106 tapped into the hub 106' reciprocating in the slot 107 of the bracket, by which when in proper position the slide-block may be locked against accidental displacement.

In either form of construction the central hollow extension or slip-sleeve 22, Figs. 10 and 11, through which passes the eye-bolt 22' secured to the block L by the securing-bolt 22''; and for the passage of cooling-air up through the block mechanism and for discharging ash dust down, that might sift in from above, the sleeve 22 is provided with the slot 108, Fig. 11, at the bottom; and a securing-bar 109 through which the eye-bolt passes, is located upon such bolt between the bottom of the extension or slip-sleeve 22 and the securing-nuts 109' to secure the eye-bolt in place when the wedges 34, are driven to proper position, by being screwed up upon the securing-bar 109.

The crusher-shaft 35, is made hollow to provide for air-cooling and the same is provided at one end with the driving-head or journal-hub or bearing 42, Figs. 2, 3 and 5, the inner end of which is provided with end-lugs interlocking with the contiguous toothed crusher-member in such manner that the rotation of such driving-head will rotate the entire train of crusher-members, for ease of rotation such driving-head being mounted in the anti-friction journal-bearing or box 42. The outer end bearing however, is held in place in the wall-plate or bracket-piece 52 secured to the furnace-wall in any suitable manner so as to provide a journal-bearing or box for the crusher-train slipped upon the hollow crusher-shaft 35; such train of crushers being interlocked and compressed together on such shaft between the driving-head 42, and the tail-head or bearing 55, Fig. 15, by the securing-nut 55'; screwed upon the threaded end of the hollow tubular crusher-shaft 35, and delivering air from such shaft and the space between same and the crusher train into the exhausting air box chamber 56, as clearly indicated in Fig. 15. The round shaft or tube 35 has a fixed bearing at the outer end of the driving-head 42 within a square hole thus affording air passages at the four corners thereof; and the same construction is applicable at the tail end 55, but a series of three lugs or feathers is preferable. The tail-head or bearing 55 interlocks with the contiguous toothed crusher-member in the same manner as does the head 42, at the other end of the train, and is revolubly mounted in a journal-box 6, supported by the bracket 6' (Figs. 6, 9 and 15) which bracket also serves as a support for the exhaust dust-box 56 and 56'. And rigidly secured to the driving-head 42, is the crusher-train drive-wheel 45, usually of the worm-gear wheel type shown, driven by an endless-screw (not shown).

Upon the outer end of the hollow-crusher-shaft 35 and abutting against the end face of the drive-head and worm-gear wheel 45 and secured in place in any suitable manner, usually by a pin 53 (Figs. 2, 3, 4 and 5) is the securing end-collar 54, of substantially the shape shown, having the air-ducts 54', communicating with the annular air-chamber 110, Figs. 3 and 5, by way of the ducts formed by the before mentioned square corners of the drive-head 42, leading air through the interior of the crusher-train exterior to the crusher-shaft 35,—so as to cool the same, while cooling air is admitted into such various longitudinal cooling air ducts of the crusher-mechanism by way of the ports 46' in the plate 52, and ports 46 in the wall of the drive-head 42.

Located immediately below the crusher-mechanism B so as to gravitationally receive therefrom the ground clinkers, ashes, etc., is the ash-chamber or trough C, Figs. 1, 2 and 15, extending longitudinally of the crusher and its apron; in which chamber or trough is located any suitable conveyer, usually and preferably of the double conveyer-screw form shown in Figs. 2 and 15; below which trough C is located, usually at the center, an ash receiving receptacle or hopper D; and the shaft 58 carrying the conveyer, for purposes of ventilation and air-cooling, is preferably hollow; and is rotated by a sprocket or other suitable drive-wheel 60, (Fig. 15) and is provided at the ends with packings 61 and 61', usually of asbestos; and communicates at its other end with a lower extension 56' of the suction dust-box 56, the drive-head and tail-piece of the crusher train being also packed in like manner as indicated at 57, and 57'; (and in fact where forced draft is used, all places where air might escape from the furnace chamber the air-exits are packed in like manner). The exhaust-pipe 56'', is connected with the boiler flue or chimney or any mechanical exhausting mechanism so that a constant draft of cooling air will be drawn through the entire crusher and conveyer mechanisms.

By the arrangement shown that portion of the crushed clinkers and ash, delivered from the central portion of the crusher, will fall directly by gravity into the hopper D, while that delivered at the end portions of the crusher-mechanism is conveyed to, and caused to fall into such hopper by the screw conveyers. And it will be seen that in the case of furnaces containing a plurality of units, one conveyer, and in fact one crusher, may be extended into and through a plurality of the furnaces; and one exhaust do for all; it being only essential that the mechanism here shown shall be sufficiently substantial.

The furnaces are of course, made of any suitable material, usually fire-brick, and in certain cases, such fire-brick is combined with concrete and structural steel, but I have not deemed it essential to indicate by reference letters or numerals these different materials, as they are self-evident from the drawing.

Located preferably adjacent to the rear of each furnace, and according to the length thereof, are one or more rousing-tool chambers E', within each of which is contained a reciprocating rousing-tool E, reciprocating into and out of the furnace, so as to break up the clinker-bed resting on the rotating crusher-mechanism B, and such chamber usually comprises a furnace face preferably of specially molded fire-clay blocks 63 Fig. 1 having the tool-slit 64, immediately behind which is located the trunnion journal-block 65, having the journals 65' which carry the rocking or vibrating trunnion tool-holder 66, preferably made in two parts and secured together by bolts 66', (Figs. 1, 7, 16 and 17) reciprocatingly supporting the forward end of the rousing-tool E, which is of any desired form, and may have only one rousing-point as shown in the drawing, or a plurality thereof, of any desired shape or form; such tool usually consisting as shown of a straight bar 67, pointed at its working end 67', which bar, in the form of construction shown in Figs. 1 and 16, for purposes of renewal is secured by bolts 68, to the head 69, vibratorily or revolubly mounted upon the crank-shaft 70 of the crank-piece 71, rigidly secured to the vibrating tool-shaft 72, in any desired manner usually by a key or feather 71' (Fig. 1).

By this construction as clearly indicated at 63 of Fig. 1, upon the vibration of the shaft 72, toward the right, the working-point 67' of the tool-bar 67, will be thrown downward out through the slit 64 into the various positions indicated by 73, to 73', and such point will penetrate the clinker-bed lying in the space between the lower end of the grate A, and the furnace wall, supported by the crusher-mechanism B, and be thrown up until it reaches the point 73', so as to break up and loosen the compact clinker-bed; and upon the reversal of the vibration of the shaft 72, the broken clinker-bed, thus loosened, will be returned by gravity, down upon the crusher-mechanism B to be further consumed.

In the slightly modified form of construction shown in Figs. 17 and 18, instead of the throw-arm or crank-piece 71, I provide a gear-wheel 80, rotated in the direction of the arrow by a smaller gear-wheel or pinion 81, mounted upon the shaft 82, in such manner as to cause the point 67' of the rousing-tool to perform a slightly different movement than in the structure shown in Fig. 1, as indicated at the points 73, 73', and 73'', (Fig. 17). That is in the structure shown in Fig. 1, the movement of the tool is downward, outward, and upward, and reversed; whereas in the structure shown in Figs. 17 and 18 the movement is downward, outward, upward, and backward, without a reversal downward, being practically a left hand-circular movement of the rousing-tool or tools.

The number of the rousing-tools used in each furnace unit varies according to circumstances, according to the particular grade of coal being used, dimensions, and various furnace conditions. Such rousing-tools may be operated individually or collectively in any desired plural number.

In Fig. 15, I have shown a structure, wherein such rousing-tools are operated in groups of two, each of which have the two outer ends of their vibrating-shafts 72, carrying the crank-levers 71, extending out through the furnace-wall, and have rigidly secured thereon the exterior crank-arms 80' actuated by the reciprocating throw-rods or bars 81', connected with any suitable power source (not shown), but it is evident that all of such rousing-tools may be actuated by the same shaft 72. In such construction as shown in Fig. 16, the shaft 72, is journaled at either end in suitable journal-boxes 84 formed integral with a journal-wall bracket 83, bolted to the furnace-wall by securing bolts 84'.

Each crank-arm 80', is provided with a position indicator pointer hand 115 secured thereto, and the furnace wall is provided with a position indicator or scale having at one end a radial position indicating index-line marked "Out", and at the other a like line marked "In", by the position of which upon the scale the positions at the moment of the rousing-tools actuated by each shaft will be at all times indicated.

In some cases by failure of rotation of the screw-conveyer, and other causes the conveyer-trough C may become clogged at the ends with clinker and ash, and I therefore provide such trough C, at the ends and bottom with the emergency bottom-doors held normally in the closing position (shown in Fig. 15) by any suitable locking mechanism, by the dropping of which doors the clinker and ash caught in the end portions of such trough may be allowed to fall by gravity into a furnace ash-pit or basement, throughout the entire length of the crushing-mechanism, even though the conveyer screw is not in rotation.

In some cases the rousing-tools may be actuated by hand by vibration of the shaft 72, but in large furnaces it is preferable to actuate them by power-means, but in either case, in order that such tools may never be subjected to the furnace-heat save while in actual rousing movement, I prefer to provide the rousing-tool operating mechanism or mechanisms with any suitable means for automatically retracting such rousing tools into their respective chambers; and I have found a vibrating weight Q, rigidly secured to the shaft 72, at any desired point, usually one within the rear portion of each rousing-tool chamber (as clearly indicated in dotted lines Fig. 16) to be a good and efficient device for such purpose.

One of the main purposes of my invention is to provide power tooling apparatus, adapted to be used with various types of furnaces, in the operation of which, little if any excess of air, especially cool air, will be allowed to enter, and in which the condition of the fuel-bed can be viewed at any time without the opening of doors so as to admit cool air.

For purposes of occasionally obtaining a particular view of the crusher-mechanism and crusher-bed through the entire longitudinal length thereof, I provide a fire lined iron access door 89, Figs. 1 and 17, in the side-wall of the furnace unit, upon the opening of which entrance may be had to the furnace for purposes of inspection, repairs, etc., located substantially in line with the axis of the crusher-mechanism, having a peep-hole 90, usually covered by a thick refractory transparent sheet of mica, etc., or a fire clay plug.

To provide means for feeding air to the furnace and directly to the material to be roused, the air preferably being fed reversely to the flow of the fuel bed, I provide in the rear or cross-wall of the furnace an air-duct 86, Fig. 1, extending longitudinally of the rear or cross-wall of the furnace, into which duct 86, air is sucked or blown, the air preferably being blown. The duct 86, has chambers 86', connecting therewith and arranged vertically to the duct 86, one of which chambers 86' is shown in section in the drawings, Fig. 1, by a full and dotted line, from which airduct 86, and communicating chambers 86', air passes to the furnace through overlying and underlying series of passages or perforations 87, Figs. 1 and 2, arranged at right angles to the air-duct 86, and communicating chambers 86', the plane of the uppermost series of passages or perforations 87, being located below the normal upper surface line of the material to be roused, whereby air is constantly delivered into the roused material from the rear of the furnace, the purpose being that this air should combine with the unconsumed carbon and other combustible matter in the roused material set free by the action of the rousing-tools, but until then unconsumed, and to consume the same.

It will be seen by an examination of the drawings especially Fig. 1, that when in the non-operative position in the rousing-tool chamber E, the working-points 67' of such tools are retracted back into the tool recess 64 thereof, and to prevent deterioration thereof by heat, a certain amount of air is allowed free access into the furnace through such slots to keep the points of such tools comparatively cool.

It is evident that many changes in the construction, combination, and arrangement of the various parts and mechanisms of my improved form of furnace, clinker-grinding and tooling-mechanisms, etc., herein set forth, and described, may be made without departing from the spirit of my invention or exceeding the scope of the claims, and I do not intend to limit myself to the exact particular construction or constructions shown.

I claim:

1. In a furnace having an ash-discharge, the combination of a grate over which fuel is fed to said ash-discharge, a reciprocatingly actuated rousing-tool for rousing and breaking up the clinker at the discharge end of the grate, and means for actuating the rousing-tool; said rousing-tool being normally located outside of the furnace and in rousing movement being moved inwardly into the furnace reversely to the fuel-bed flow.

2. In a furnace having an ash-discharge, the combination of a grate over which fuel is fed to said ash-discharge, a plurality of power-actuated rousing-tools for rousing and breaking up the clinker-bed at the discharge end of the grate, and means for actuating the rousing-tools; said rousing-tools being normally located outside of the furnace and in rousing movement being moved inwardly into the furnace reversely to the fuel-bed flow.

3. In a furnace having an ash-discharge, the combination of a grate over which fuel is fed to said ash-discharge, a plurality of simultaneously movable power-actuated rousing-tools for rousing and breaking up the clinker-bed at the discharge end of the grate, and means for simultaneously actuating the rousing-tools; said rousing-tools being normally located outside of the furnace and in rousing movement being moved inwardly into the furnace reversely to the fuel-bed flow.

4. In a furnace having an ash-discharge, the combination of a grate over which fuel is fed to said ash-discharge, a power-actuated rousing-tool adapted to be driven into and under the clinker-bed in a downwardly inclined direction and lifted upward and retracted rearward in downward direction from the clinker-bed, and means for actuating the rousing-tool; said rousing-tool being normally located outside of the furnace and in rousing-movement being moved inwardly into the furnace reversely to the fuel-bed flow.

5. In a furnace having an ash-discharge, the combination of a grate over which fuel is fed to said ash-discharge, a plurality of power-actuated rousing tools having working points and being adapted to be driven into and under the clinker-bed in a downwardly inclined direction and lifted upward and retracted rearward in downward direction from the clinker-bed, and means for actuating the rousing-tools, said rousing-tools being normally located outside of the furnace and in rousing movement being moved inwardly into the furnace reversely to the fuel-bed flow.

6. In a furnace having an ash-discharge, the combination of a grate over which fuel is fed to said ash-discharge, a plurality of simultaneously movable power-actuated rousing-tools having working points and adapted to be driven into and under the clinker-bed in a downwardly inclined direction and lifted up and retracted in a downward direction from the clinker-bed, and power means for actuating the rousing-tools, said rousing-tools being normally located outside of the furnace and in rousing position moved inwardly into the furnace reversely to the fuel-bed flow.

7. In a furnace having an ash-discharge, the combination of a grate over which fuel is fed to said ash-discharge, a power-actuated rousing-tool for rousing and breaking up the clinker-bed at the discharge end of the grate, power means for actuating the rousing-tool, a rousing-tool chamber, a rousing-tool chamber wall having an opening therethrough for the rousing-tool and for passage of air to the point of the rousing-tool when the rousing-tool is withdrawn from the furnace beyond the discharger point of the grate; said rousing-tool being normally located outside of the furnace and in rousing movement being moved inwardly into the furnace reversely to the fuel-bed flow.

8. In a furnace having an ash-discharge, the combination of a grate over which fuel is fed to said ash-discharge, a plurality of power actuated rousing-tools for rousing and breaking up the clinker-bed at the discharge end of the grate, power means for actuating the rousing-tools, rousing-tool chambers, provided with walls having openings therethrough for the rousing-tools and for passage of air to the points of the rousing-tools when the rousing-tools are withdrawn from the furnace beyond the discharger point of the grate; said rousing-tools being normally located outside of the furnace and in rousing movement being moved inwardly into the furnace reversely to the fuel-bed flow.

9. In a furnace having an ash-discharge, the combination of a grate over which fuel is fed to said ash-discharge, a power actuated rousing-tool for rousing and breaking up the clinker-bed at the discharge end of the grate, means for actuating the rousing-tool and a rear wall for the furnace having means for passage of air therethrough to the material to be roused located in said rear wall below the normal upper surface of the material to be roused, said rousing-tool being normally located outside of the furnace and in rousing movement being moved inwardly into the furnace reversely to the fuel-bed flow.

10. In a furnace having an ash-discharge, the combination of a grate over which fuel is fed to said ash-discharge, a plurality of power actuated rousing-tools for rousing and breaking up the clinker-bed at the discharge end of the grate, means for actuating the rousing-tools, and a rear wall for the furnace having means for passage of air therethrough to the material to be roused located in said rear wall below the normal upper surface of the material to be roused; said rousing-tools being normally located outside of the furnace and in rousing movement being moved inwardly into the furnace reversely to the fuel-bed flow.

11. In a furnace having an ash-discharge, the combination of a grate over which fuel is fed to said ash-discharge, a power actuated rousing-tool for rousing and breaking up the clinker-bed at the discharge end of the grate, power means for actuating the rousing-tool, a rousing-tool chamber, a rousing-tool chamber wall having a slot therethrough for the rousing-tool and for passage of air to the point of the rousing-tool when the rousing-tool is withdrawn from the furnace beyond the discharger point of the grate, and a rear wall for the furnace having means for passage of air therethrough to the material to be roused located in said rear wall below the normal upper surface of the material to be roused; said rousing-tool being normally located outside of the furnace and in rousing movement being moved inwardly into the furnace reversely to the fuel-bed flow.

12. In a furnace having an ash-discharge; the combination of a grate over which fuel is fed to said ash-discharge, a plurality of power actuated rousing-tools for rousing and breaking up the clinker-bed at the discharge end of the grate, power means for actuating the rousing-tools, rousing-tool chambers, provided with walls having slots therethrough for the rousing-tools and for passage of air to the points of the rousing tools when the rousing-tools are withdrawn from the furnace beyond the discharger point of the grate, and a rear wall for the furnace having means for passage of air therethrough to the material to be roused located in said rear wall below the normal upper surface of the material to be roused; said rousing-tools being normally located outside of the furnace and in rousing movement being moved inwardly into the furnace reversely to the fuel-bed flow.

13. In a furnace having an ash-discharge, the combination of a grate over which fuel is fed to said ash-discharge, a reciprocatingly actuated rousing-tool for rousing and breaking up the clinker at the discharge end of the grate, means for actuating the rousing-tool, and a rear wall for the furnace having a longitudinal air duct and having vertical chambers communicating with said air duct and having air passages from said air duct and from said chambers for supplying air to the material to be roused by the rousing-tool; said air passages being arranged in overlying and underlying series in said rear wall and the uppermost of said series being located below the normal upper surface of the material to be roused.

14. In a furnace having an ash-discharge, the combination of a grate over which fuel is fed to said ash-discharge, reciprocatingly actuated rousing-tools for rousing and breaking up the clinker at the discharge end of the grate, means for actuating the rousing-tools, and a rear wall for the furnace having a longitudinal air duct and having vertical chambers communicating with said air duct and having air passages from said air duct and from said chambers for supplying air to the material to be roused by the rousing-tools; said air passages being arranged in overlying and underlying series in said rear wall and the uppermost of said series being located below the normal upper surface of the material to be roused.

15. In a furnace having an ash-discharge and a grate over which fuel is fed to said ash-discharge, the combination of a rousing-tool comprising a reciprocating tool-bar slidingly mounted in a rocking trunnion casing, and mechanism for reciprocating the rousing-tool in the trunnion casing and simultaneously rocking said trunnion casing, said rousing-tool being normally located outside of the furnace and in rousing movement being moved inwardly into the furnace reversely to the fuel-bed flow.

16. In a furnace having an ash-discharge and a grate over which fuel is fed to said ash-discharge, the combination of a rousing-tool comprising a resiprocating tool-bar slidingly mounted in a rocking trunnion casing, and power mechanism for reciprocating the rousing-tool in the trunnion casing and simultaneously rocking said trunnion casing; such rousing-tool being normally located outside of the furnace and in rousing movement being moved inwardly into the furnace reversely to the fuel-bed flow.

17. In a furnace having an ash-discharge and a grate over which fuel is fed to said ash-discharge, the combination of a rousing-tool comprising a reciprocating tool-bar slidingly mounted in a rocking trunnion casing, and mechanism for reciprocating the rousing-tool in the trunnion casing and simultaneously rocking said trunnion casing; said rousing-tool when drawn back in the trunnion casing being normally located outside of the furnace and in rousing movement being moved inwardly into the furnace reversely to the fuel-bed flow.

18. In a furnace having an ash-discharge and a grate over which fuel is fed to said ash-discharge, the combination of a rousing-tool comprising a reciprocating tool-bar slidingly mounted in a rocking trunnion casing, and power mechanism for reciprocating the rousing-tool and simultaneously rocking the trunnion casing; said rousing-tool when drawn back in the trunnion casing being normally located outside of the furnace and in rousing movement being moved inwardly into the furnace and reversely to the fuel-bed flow.

19. In a furnace the combination with a combined clinker-crusher and ash-discharge, of a grate over which the fuel is fed to the clinker-crusher and ash-discharge, a rousing-tool comprising a reciprocating tool-bar slidingly mounted in a rocking trunnion casing, and mechanism for reciprocating the tool-bar in the trunnion casing and simultaneously rocking the trunnion casing; said rousing-tool when drawn back in the trunnion casing being normally located outside of the furnace and in rousing movement being moved inwardly into the furnace reversely to the fuel-bed flow.

20. In a furnace, the combination with a combined clinker-crusher and ash-discharge of a grate over which fuel is fed to the combined clinker-crusher and ash-discharge, a rousing-tool comprising a reciprocating tool-bar slidingly mounted in a rocking trunnion casing, and power mechanism for reciprocating the tool-bar in the trunnion casing and simultaneously rocking the trunnion casing, said rousing-tool when drawn back in the trunnion casing being normally located outside of the furnace and in rousing movement being moved inwardly into the furnace reversely to the fuel-bed flow.

21. In a furnace, the combination of a rousing-tool and power mechanism adapted to move the rousing tool into the furnace from non-working position in a downwardly inclined direction and upward, backward and downward to the original non-working position, in substantially a circular path; said rousing-tool when in non-working position being located outside of the furnace and in rousing movement being moved inwardly into the furnace.

22. In a furnace, the combination of a rousing-tool and operating mechanism therefor comprising a crank-shaft revolubly attached to the rousing-tool at its non-working end whereby, upon movement of the crank-shaft the rousing-tool is reciprocated into and back out of the furnace; said rousing tool being normally located outside of the furnace and in rousing movement being moved inwardly into the furnace.

23. In a furnace, the combination of a rousing-tool and mechanism for operating the rousing-tool at its non-working end and a member carrying the crank-shaft adapted by its rotation to move the crank-shaft in a circular path and thereby to move the rousing-tool from non-working position into the furnace in a downwardly inclined direction and upward, backward, and downward to the original non-working position, the rousing-tool in such movement describing substantially a circular path; said rousing-tool being normally located outside of the furnace and in rousing-movement being moved inwardly into the furnace.

24. In a furnace, the combination with a grate, of a rotating clinker-crusher mechanism located near the discharge end of the grate to receive the ash and clinkers therefrom, a rousing-tool bar normally located within said rousing-tool chamber outside of the furnace but in communication therewith beyond the clinker-crusher, and power mechanism for thrusting the rousing-tool bar point into the clinker-bed supported by the clinker crusher, moving such point upward to rouse the clinker-bed, and retracting the tool-bar out of the furnace.

25. In a furnace, the combination with a grate, of a rotating clinker-crusher mechanism located near the discharge end of the grate to receive the ash and clinker therefrom, rousing-tool chambers, a plurality of rousing-tool bars each normally located within a rousing-tool chamber outside of the furnace but in communication therewith beyond the clinker-crusher, and power mechanism for thrusting the rousing-tool bars points into the clinker-bed supported by the clinker crusher, moving such points upward to rouse the clinker-bed, and retracting the tool-bars out of the furnace.

26. In a furnace, the combination, with a grate, of a rotating clinker-crusher mechanism located near the discharge end of the grate to receive the ash and clinker therefrom, rousing-tool chambers, a plurality of rousing-tool bars each normally located in a rousing-tool chamber outside of the furnace but in communication therewith beyond the clinker-crusher, and power mechanism for simultaneously thrusting the rousing-tool bars' points into the clinker-bed supported by the clinker-crusher, moving such points upward to rouse the clinker-bed, and retracting the tool bars out of the furnace.

OROSCO C. WOOLSON.

Witnesses:
GEORGE J. BARTELS,
CLARENCE LADD DAVIS.